2,743,249

PROCESS FOR THE PREPARATION OF STYRENATED OIL-MODIFIED ALKYD RESINS USING PINANE HYDROPEROXIDE AS CATALYST

Albert Kirsch, Stamford, Conn., assignor to American Cyanamid Company, New York, N. Y., a corporation of Maine No Drawing. Application October 11, 1954, Serial No. 461,659

8 Claims. (Cl. 260—22)

This invention relates to modified alkyd resins and to the process of preparing the same. More particularly, this invention relates to the process of reacting certain styrene compounds with an oil-modified alkyd resin in a mutually inert solvent having a boiling point of at least 110° C. and a Kauri-butanol value between 24–100, in the presence of pinane hydroperoxide.

One of the objects of the present invention is to produce a modified alkyd resin, which has particular application in the field of surface coating. A further object of the present invention is to produce a styrenated alkyd resin in the presence of a mutually inert mineral spirits solvent having a boiling point of at least 110° C. and a Kauri-butanol value between 24–100. A further object of the present invention is to produce coating compositions, which are homogeneous in the liquid state, and which are homogeneous in a cured film, and which further have markedly improved properties with respect to the drying time, hardness, gloss, alkali resistance, and alcohol resistance. These and other objects of the present invention will be discussed more fully hereinbelow.

I have found that pinane hydroperoxide, besides accelerating co-reaction and effecting almost complete reaction of styrene and unsaturated oil in a much reduced time, exerts an important and hitherto unrecognized influence on the properties of the resulting interpolymer. By the use of this catalyst, it is possible to prepare styrene unsaturated ester interpolymers in which 90–100% of the styrene is completely combined. These interpolymer solutions are completely clear and homogeneous, show excellent stability characteristics, and have wider compatibilities with other film-forming materials than similar interpolymers made by previous methods. An additional novel feature of the interpolymers described herein, is their unusually good solubility in aliphatic hydrocarbons solvents, which are preferred solvents in the coating industry because of their low cost and negligible odor. In this regard, it is also desirable that such resin solutions tolerate at least 50 cc. and, preferably, 100 cc. of mineral spirits per 10 grams of resin solution, to insure that no precipitation of resin will occur during subsequent thinning operations, or in cleaning of spray equipment or brushes. All of the products produced according to the teachings of this invention, tolerate at least 50 cc. and, in most cases, more than 100 cc. Varsol #2 type mineral spirits per 10 grams resin solution. The tolerance for Varsol #1 type mineral spirits is slightly less but in most instances is well above the desired minimum value specified above. In addition to the use of Varsol #1, having a Kauri-butanol value of 36 and Varsol #2, having a Kauri-butanol value of 43, one can make use of such mutually inert solvents as Ultracene having a Kauri-butanol value of 27, kerosene having a Kauri-butanol value of 32, Solvasol No. 75 having a Kauri-butanol value of 77, Solvesso No. 100 having a Kauri-butanol value of 90, xylol having a Kauri-butanol value of 93 and the like. The Kauri-butanol value of toluene is 100 and, as a consequence, this solvent represents the upper limit of solvents that may be used in keeping with the requirements of the present invention.

By practicing the process of the present invention, it is possible to coreact from 5–95% of a styrene compound, and preferably, 10–50% of a styrene compound based on the final interpolymeric reaction product, depending for optimum results upon the percentage of phthalic content of the alkyd as well as the type of oil employed in modifying the alkyd.

We have found that to effect the reaction to give most satisfactory results and the preferred useful products, the coreaction must be effected at a temperature above 150° C. and below the temperature at which depolymerization of polystyrene occurs at a significant rate (290° C.–300° C.), the preferred temperature range being between 160–175° C. It is further preferred that the reaction temperature does not exceed 215° C. significantly.

In the practice of the process of the present invention, pinane hydroperoxide is used as the catalyst in an amount varying between about 0.05% to about 5% by weight based on the total weight of the coreaction materials. From an optimum viewpoint, it is preferred to use from about 1–2% by weight of the catalyst.

The unsaturated oil-modified alkyd resins which may be employed in practicing this invention are the conventional type of alkyd resin made by coreacting a polybasic acid, an unsaturated vegetable oil introduced partly or wholly in the form of fatty acid or monoglyceride, and a polyhydric alcohol at an elevated temperature until esterification is substantially complete. At least 90% by weight of the polybasic acid component should consist of a saturated acid, i. e., a polycarboxylic acid free of non-benzenoid unsaturation, preferably phthalic, although others may be employed; and the remainder of the polybasic acid may or may not be unsaturated. The polyhydric alcohol component may be any one of the available polyhydric alcohols or mixtures thereof, such as ethylene glycol, diethylene glycol, propylene glycol, polyglycols, such as hexaethylene glycol, glycerine, trimethylol propane, trimethylol ethane, pentaerythritol, dipentaerythritol and the like.

The major oil constituent of the alkyd resin is an unsaturated vegetable oil selected from the class of drying and semi-drying oils. Among the various oils which may be used singly or in combination as modifiers for the alkyd resin may be mentioned the following: china wood oil, dehydrated castor oil, castor oil, linseed oil, perilla oil, soya oil, corn oil, cotton seed oil, talloil, distilled talloil fatty acids, etc. These may be used singly or in combination with one another, or in combination with relatively saturated oils such as coconut, olive, almond and the like.

The proportion of the styrene compound which can be coreacted with the alkyd resin is dependent on the degree of unsaturation in the oil, as well as the type of unsaturation, that is, whether conjugated or non-conjugated. A further important factor is the oil content of the alkyd resin itself.

From a practical viewpoint, the least unsaturated oils which may be employed are: corn, cottonseed and soya oils. China wood oil and dehydrated castor oil may be used to modify alkyd resins which combine readily with styrene to yield homogeneous, stable, fast-drying interpolymers. Linseed and perilla oils occupy an intermediate position between the above groups, with respect to reactivity with the styrene compounds.

Although phthalic anhydride is the preferred polycarboxylic acid free from non-benzenoid unsaturation which may be used in the practice of the process of the present invention, other comparable acids may be used as malonic, succinic, glutaric, sebacic, adipic, pimelic, suberic, malic, azelaic and the like. Whenever available, the anhydrides of these acids may be used or mixtures of these acids and/or their anhydrides may be used.

In the place of styrene per se, one may make use of ring substituted chloro styrenes and/or ring substituted alkyl styrenes such as the o, m, and p-chloro styrenes, 2,4-dichloro styrene, 2,5-dichloro styrene, 3,4-dichloro styrene, o, m, and p-methyl styrenes, 2,4-dimethyl styrene, 2,5-dimethyl styrene, 2,4-diethyl styrene, 2,5-diethyl styrene and the like. Obviously, these styrenes may be used either singly or in combination with one another.

In order that the present invention may be more completely understood, the following examples are set forth in which all parts are parts by weight. These examples are set forth primarily for the purpose of illustration and any specific enumeration of detail contained therein should not be interpreted as a limitation on the case except as indicated in the appended claims.

EXAMPLE 1

Into a suitable reaction vessel equipped with stirrer, thermometer and reflux condenser, there is introduced 148 parts of phthalic anhydride, 73 parts of refined soya oil acids, 38 parts of soya oil, 120 parts of refined castor oil, and 96 parts of glycerin, 95%. The materials are heated to 286° C. for approximately 2 hours using nitrogen gas to remove the water formed and then the charge is cooled to about 245° C. and maintained at that temperature for about 4 hours. A sample of the finished resin is dissolved in mineral spirits to give a 50% solution having the following characteristics: Acid No. 8.5, Viscosity—X-Y (Gardner-Holdt), Color—3 (Gardner 1933).

EXAMPLE 2

Interpolymer resin solution

Into a suitable reaction vessel equipped with thermometer, stirrer and reflux condenser, there is introduced 55 parts of the alkyd resin prepared according to Example 1 and 60.5 parts of xylol. The mixture is heated to reflux temperature (about 143° C.), whereupon there is added 2.08 parts of pinane hydroperoxide dissolved in 45 parts of methyl styrene. This addition is accomplished slowly over a period of about 1 hour while maintaining the sphere of reaction at reflux temperature. After the addition is completed, the resin is refluxed for about 6 hours. The final resin solution having a solids content of 59.6% had a viscosity of X-Y (Gardner-Holdt) and a monomer conversion of 93.7%.

EXAMPLE 3

Interpolymer resin solution

Example 2 is repeated in every detail except that in the place of monomeric styrene, there is substituted an equivalent amount of monomeric 2,4-dimethyl styrene. The resultant resin had comparable characteristics.

All of the interpolymer resin solutions were clear solutions, which, when applied to surfaces such as wood, sheet metal and the like, produced clear films. These resins solutions may be applied to surfaces by any conventional method such as by brushing or spraying. When permitted to air dry, these resins form clear films which exhibit excellent clarity, gloss, gloss retention, resistance to acids, alkalis, organic solvents and abrasion.

I claim:

1. A process which comprises coreacting, at a temperature between 130–215° C., a member selected from the group consisting of styrene, ring-substituted alkyl-styrenes and ring-substituted chloro-styrenes and an unsaturated oil-modified alkyd resin, in a mutually inert solvent having a boiling point above 110° C. and a Kauri-butanol value between 24–100 in the presence of from 0.05% to 5% by weight of pinane hydroperoxide, wherein the oil modifier of said oil modified alkyd resin is selected from the group consisting of drying and semi-drying oils; wherein the polycarboxylic acid used to prepare said alkyd resin consists of at least 90% by weight of a polycarboxylic acid free from non-benzenoid unsaturation.

2. A process which comprises coreacting, at a temperature between 130–215° C., styrene and an unsaturated oil-modified alkyd resin, in a mutually inert solvent, having a boiling point above 110° C. and a Kauri-butanol value between 24–100, in the presence of from 0.05% to 5% by weight of pinane hydroperoxide, wherein the oil modifier of said oil-modified alkyd resin is selected from the group consisting of drying and semi-drying oils; wherein the polycarboxylic acid used to prepare said alkyd resin consists of at least 90% by weight of a polycarboxylic acid free from non-benzenoid unsaturation.

3. A process which comprises coreacting, at a temperature between 130–215° C., styrene and a soya oil-modified alkyd resin, in a mutually inert solvent, having a boiling point above 110° C. and a Kauri-butanol value between 24–100, in the presence of from 0.05% to 5% by weight of pinane hydroperoxide, wherein the polycarboxylic acid used to prepare said alkyd resin consists of at least 90% by weight of a polycarboxylic acid free from non-benzenoid unsaturation.

4. A clear solution, capable of producing clear film upon air-drying, comprising an inert hydrocarbon solvent having a boiling point above 110° C. and a Kauri-butanol value of 24–100, and having coreacted therein styrene and an unsaturated oil-modified alkyd resin at a temperature between 130–215° C. in the presence of from 0.05% to 5% by weight of pinane hydroperoxide, said solution having 90%–100% of said styrene reacted and said solution having a mineral spirits tolerance greater than 50 cc. per 10 grams of solution, wherein the oil modifier of said oil-modified alkyd resin is selected from the group consisting of drying and semi-drying oils; wherein the polycarboxylic acid used to prepare said alkyd resin consists of at least 90% by weight of a polycarboxylic acid free from non-benzenoid unsaturation.

5. A clear solution, capable of producing clear film upon air-drying, comprising an inert hydrocarbon solvent having a boiling point above 110° C., and a Kauri-butanol value of 24–100, and having coreacted therein styrene and a soya oil-modified alkyd resin, at a temperature between 130–215° C. in the presence of from 0.05% to 5% by weight of pinane hydroperoxide, wherein the polycarboxylic acid used to prepare said alkyd resin consists of at least 90% by weight of a polycarboxylic acid free from non-benzenoid unsaturation.

6. A process which comprises coreacting, at a temperature between 130–215° C., a ring-substituted dichlorostyrene and an unsaturated oil-modified alkyd resin, in a mutually inert solvent, having a boiling point above 110° C. and a Kauri-butanol value between 24–100, in the presence of from 0.05% to 5% by weight of pinane hydroperoxide, wherein the oil modifier of said oil-modified alkyd resin is selected from the group consisting of drying and semi-drying oils; wherein the polycarboxylic acid used to prepare said alkyd resin consists of at least 90% by weight of a polycarboxylic acid free from non-benzenoid unsaturation.

7. A process which comprises coreacting, at a temperature between 130–215° C., a ring-substituted alkyl-styrene and an unsaturated oil-modified alkyd resin, in a mutually inert solvent, having a boiling point above 110° C. and a Kauri-butanol value between 24–100, in the presence of from 0.05% to 5% by weight of pinane hydroperoxide, wherein the oil modifier of said oil-modified alkyd resin is selected from the group consisting of drying and semi-drying oils; wherein the polycarboxylic acid used to prepare said alkyd resin consists of at least 90% by weight of a polycarboxylic acid free from non-benzenoid unsaturation.

8. A process which comprises coreacting, at a temperature between 130–215° C., a ring-substituted chlorostyrene and an unsaturated oil-modified alkyd resin, in a mutually inert solvent, having a boiling point above 110° C. and a Kauri-butanol value between 24–100, in the presence of from 0.05% to 5% by weight of pinane hydroperoxide, wherein the oil modifier of said oil-modified alkyd resin is selected from the group consisting of drying and semi-drying oils; wherein the polycarboxylic acid used to prepare said alkyd resin consists of at least 90% by weight of a polycarboxylic acid free from nonbenzenoid unsaturation.

References Cited in the file of this patent
UNITED STATES PATENTS

| | | |
|---|---|---|
| 2,534,617 | Mohrman | Dec. 19, 1950 |

FOREIGN PATENTS

| | | |
|---|---|---|
| 683,126 | Great Britain | Nov. 26, 1952 |

OTHER REFERENCES

Fisher et al.: Ind. and Eng. Chem., pages 671–74, March 1951, Peroxide Digest.